INVENTOR.
GUY O. CONNER
BY
W. H. Woodlief
ATTORNEY

INVENTOR.
GUY O. CONNER
BY W. H. Woodlief
ATTORNEY

United States Patent Office 3,013,474
Patented Dec. 19, 1961

3,013,474
MECHANISM FOR WORKING TUBULAR MEMBERS
Guy O. Conner, Cleveland, Ohio, assignor to Republic Steel Corporation, Cleveland, Ohio, a corporation of New Jersey
Original application Mar. 12, 1951, Ser. No. 215,131, now Patent No. 2,828,492, dated Apr. 1, 1958. Divided and this application Mar. 25, 1958, Ser. No. 723,691
6 Claims. (Cl. 90—20)

This invention relates to a machine for performing work on tubular members. This application embraces certain features of the metal working machine disclosed in my United States Patent 2,828,492, dated April 1, 1958, for Nut Tapping Machine Having Releasable Tap Holding Means to Discharge Tapped Nuts Therefrom, of which this application is a division.

In the aforesaid patent, there is disclosed a machine for the performance of various operations such as threading, forging, spinning, etc., upon metal blanks, all at high speed while the workpieces are held in a rotary work holder or turret as metal working tools are brought into play on the workpieces such that a plurality of workpieces are processed at the same time. Only so much of the disclosure of said patent will be repeated herein as may be necessary to relate the modifications of this application to the machine of the patent.

It is a particular object of the present invention to provide novel work and tool holder arrangements adapted to the working of tubular members.

It is a further object of the invention to provide a work holder for a machine of the kind disclosed in my aforesaid patent adapted to hold tubular workpieces such that tapered threads or surfaces can be formed at opposite ends of such workpieces at a single operation and by employing a single metal working tool.

It is a further object of the invention to provide novel work holding mechanism adapted to hold tubular workpieces while a metal working tool associated with such work holder performs a forming operation.

It is still a further object of the invention to provide means for continuously feeding workpieces to a work holder such that metal working tools may operate on such pieces in a continuous manner.

Other objects of the invention will be stated in the following description thereof and still others will become apparent from a reading of the following specification in light of the drawings forming a part of this specification, in which drawings like reference numerals indicate like parts, and in which.

Briefly, my invention relates to work holding and workpiece injecting and ejecting mechanism for an automatic machine having one or more horizontal spindles operated from a central shaft such as that of my aforesaid patent. In the machine of my patent, the spindles, in addition to being rotated about the central axis of the machine, revolve to drive a tool and are moved axially by a stationary cam or similarly actuating mechanisms. The spindles are very accurately and firmly located to avoid misalignment or play. The spindles are arranged around the central axis of the machine in two matched sets, each spindle having an axially aligned, matching spindle facing it from the opposite set. Cam operated rods extending through the spindles provide positively operated means for passing the tool from one head to another. For some operations, the tool will not be passed, but complementary tools may be held by opposing spindles thus performing different types of operation.

Figure 1:
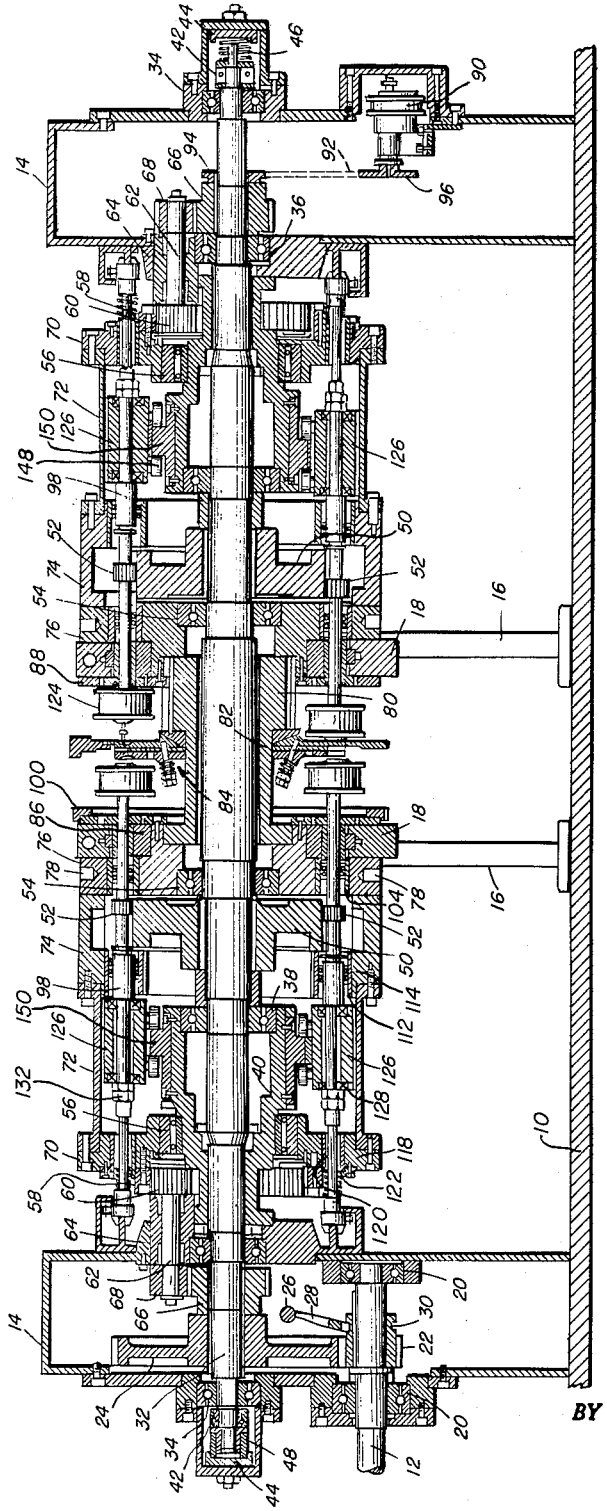
FIG. 1 is a longitudinal medial sectional view through the machine in which the inventions herein may be embodied, said figure being the same as FIG. 3 of said patent.
Figure 2:
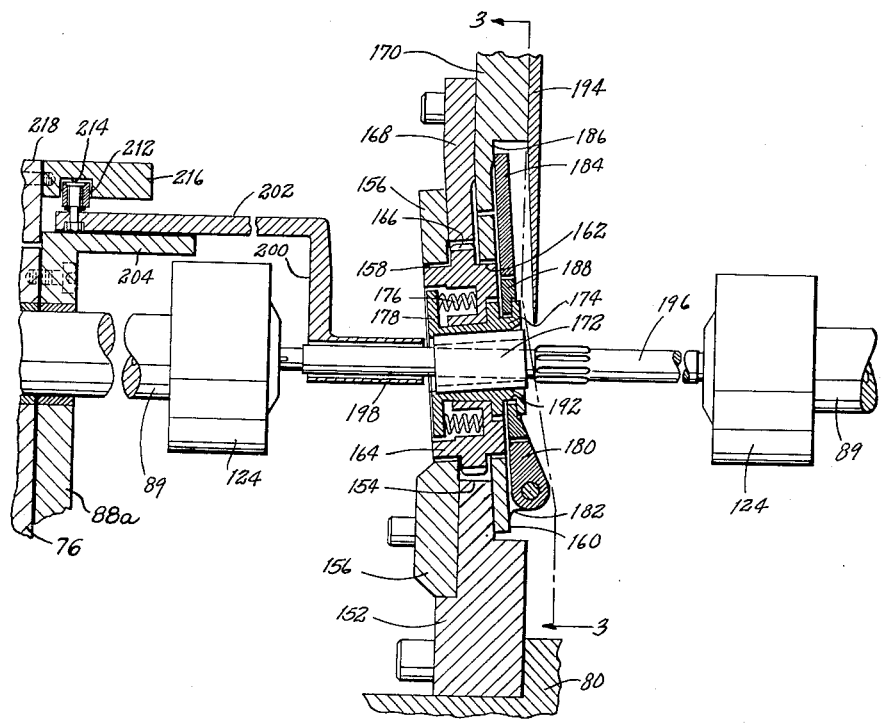
FIG. 2 is a longitudinal sectional view through a work holding mechanism of the invention, said mechanism being a modification of that shown in FIG. 1.

The center of the machine between the two spindles, as shown in FIGS. 1 and 2, is occupied by a work holding mechanism adapted to receive a workpiece for each pair of spindles. The work holder securely clamps the workpiece in a fixed position whereby it is accurately located relative to the spindles. The work holder carries the workpiece along in fixed relation to the spindles, to a discharge point where it is discharged positively from the work holder. In the form of the mechanism shown in FIGURES 5 through 7 the function of the work holding turret is assumed by the spindles at one side of the machine.

The following more specific description will be made with reference to the drawings and will pertain particularly to the machine as set up to thread nuts and collets.

With reference to the drawings throughout which like reference characters are used to designate like parts, I have used the character 10 to designate the base on which the machine is mounted. A main drive motor (not shown) is mounted at one end of the base and is connected to a drive shaft 12 by a suitable coupling. The supporting structure for the machine includes end standards 14 which comprise not only end supports for the machine but also housings for the gear drive and certain auxiliary equipment as will appear later. Auxiliary supports 16 for the center section are also mounted on the base 10. The supports 16 are merely legs carrying guide members 18 whose formation and function will be described hereinafter. When the machine is in operation, suitable covers are employed to enclose the mechanism.

As is best shown in FIG. 1, the drive shaft 12 is journalled in ball bearings 20, in the left hand standard 14. A pinion 22 is mounted on the shaft 12 and is splined thereto such that it may be moved into or out of engagement with a gear 24 by manipulating a lever and associated shifting mechanism. This mechanism is a simple fork shifting arrangement comprising a shaft 26 to which is fixed a shifting fork 28. This fork engages a groove 30 in a collar on the pinion 22 in a manner well known in the art and thus is adapted to shift the pinion into and out of driving engagement with the gear 24.

The drive from the pinion is normally transmitted to the gear 24 and thence to a main drive shaft 32. The shaft 32 is journalled near its end in end bearings 34 in the outer walls of both standards 14 and also in near end bearings 36 in the inner walls. Still further support is provided approximately midway between the center of the shaft and both ends by near center bearings 38 mounted in central stationary members 40. These latter members are bolted or otherwise suitably mounted on the inner walls of the standard 14 at both ends. Thus the shaft is supported by six bearings. Firm support such as this is necessary because the shaft is the sole support of nearly all of the operating mechanism of the machine. Furthermore, such support will help to prevent whipping of the long shaft. A thrust bearing 42 is provided at each end of the shaft. Adjustable cupped members 44 are mixed to the standards 14 and on one end adjust the compressive force of a spring 46. A spacer 48 is substituted for the spring 46 on the other end, but in other respects the devices on both ends are the same.

A pair of large "bull" or sun gears 50 are keyed to the shaft adjacent to and inboard of the near center bearings 38. These gears are the sun gears for two symmetrical planetary gear systems formed by planetary pinions 52 carried about the sun gears 50 by an irregular shaped drum supported partly on the shaft by center bearings 54 and partly on the stationary members 40 by roller bearings 56. This drum is driven from both ends through internal ring gears 58, driven by pinions 60. The pinions 60 in turn are keyed to similar countershafts 62 journalled in bearing brackets 64 mounted on the inner wall of the standards 14. These countershafts 62 are driven by the main shaft 32 through gears 66 keyed to the main shaft and meshing with gears 68 on the countershafts 62.

The main drum is substantially symmetrical end-for-end, except directly at its center. The ring gears 58 are mounted on end plates 70 which also support the roller bearings 56. These end plates 70 are connected to the rest of the drum by cover members 72 which may conveniently be bolted to the end plates 70 and to spindle supporting members 74. The spindle supporting members 74 are fastened to inner wall members 76 on both sides of the center section of the machine. Holes 78 may be provided in the wall member 76 into which a bar may be inserted for turning the machine by hand if desired. The wall members 76 hold the center bearings 54 and so help to support the drum. A center hub 80 joins the wall members from both sides and completes the basic structure of the rotating drum. The hub 80 is the only part of the drum assembly which is not symmetrical, being formed with a shoulder 82 to which a face plate and clamping or work holding mechanism 84 is fastened. A second spindle support member 86 may be bolted or otherwise fastened to the wall members 76 on each drum, and a cover plate 88 may be used to cover the complete end of the assembly. The cover 88 and spindle support 86 slide freely relative to the guide member 18 and are particularly useful to provide proper lubrication and flushing of chips.

A small oil pump 90 may be mounted in one of the end supports 14 to provide lubrication for the gears and bearings in that support. The pump is driven by a chain 92 engaged with a sprocket 94 on the main shaft and driving a sprocket 96 on the pump shaft. A sump may be formed in the base of the support to catch the oil and supply it to the intake side of the pump 90.

As noted above, the eight spindles on each side of the embodiments of FIGS. 1 and 2 are driven by the meshing engagement of the bull gears 50 with the pinions 52 on the spindles. Each of the spindles is adapted for longitudinal as well as rotary motion, thus being adapted to carry driving heads which drive a tool in a rotary motion while feeding it through a nut blank, or other workpiece, and then following discharge of the finish nut, the heads carried by the spindles return the tool to its original position. It will be apparent that, while the shaft 32 is rotating in one direction, the spindle-carrying drum device will be driven in the opposite direction because of the internal gear drive at the ends of the drum. Thus, the pinions 52 are carried around the bull gears 50 in a planetary manner and consequently are driven at a comparatively high speed. The pinions 52 may be formed as a part of the spindle 98 itself or may be suitably fixed thereto. It will be apparent that the direction of rotation of any or all of the spindles could be reversed by use of an idler gear between the pinion 52 and the bull gear 50. This might be useful in an operation where it was desired that the spindle on one side rotate in a direction opposite to that of the spindles on the other side, and, as to be pointed out, it is also contemplated that in some cases one spindle of a pair may be caused to rotate only. The spindle 98 extends through four of the individual members of the rotating drum. At its right hand end the spindle is journalled in a bronze bearing bushing 100 pressed into the support member 86. Suitable packing is provided between the cover 88 and the flange of the bushing to keep dirt and chips isolated from the bearings within the drum member, and to keep cutting fluid and the like within the bushing as will appear hereinafter.

The spindle 98 next passes through the end wall member 76. At this point, a hardened steel bushing 104 is pressed into the member. The surface of the spindle adjacent this bushing is also hardened. A form of ball bearing which will journal the shaft both for rotational and longitudinal motion is provided in the space between the bushing and the spindle. This bearing is formed by a sleeve made of brass or similar material and into which two or more circumferential rows of balls are staked in holes formed therein. This assembly of balls and retainer is placed between the bushing 104 and the spindle shaft in that region which then act as races for the ball bearing. It is evident that, in addition to the rotary motion of a regular ball bearing, the spindle can move longitudinally, rolling the balls on the bushing 104 and causing the retainer and ball assembly to move longitudinally one-half the distance moved by the spindle. The bearing is formed so that the balls are preloaded. That is, the diameters of the balls are slightly greater than the space allowed for them between the bushing 104 and the spindle 98. This preload is preferably of the order of .0003 to .0005 inch. A snap ring may be provided for this bearing and may also be used for the others to hold standard oil seal rings in place if desired.

The second and third spindle bearings are similarly formed and preloaded. The second bearing 112 is located in an inwardly extending, wide flange 114 formed in the spindle support member 74. This bearing also includes a hardened bushing pressed into an opening in the flange 114 as a race for the bearing. The third bearing 118 includes a bushing 120 pressed into the end plate 70 and on which the bearing may roll. A cover plate 122 may be provided at this end to protect the bearings and retain grease.

At its end nearest the center of the machine, each spindle of FIGS. 1 and 2 carries a tool holding head 124 which are according to the construction and operation specifically disclosed in my aforesaid patent. The pinion 52 is located between the first and second bearings 106 and 112, and a follower block 126 which controls the longitudinal movement of the spindle is located between the second and third bearings. The spindles are journalled in the follower block by two commercial angular contact ball bearings 128, one at each end of the block. A fixed position of the spindle relative to the block is maintained by engagement of one of the bearings with a shoulder on the spindle against which the bearing is held by the pressure of a nut 132 against the other bearing.

The follower block 126 is an irregularly shaped block having an outer surface of part cylindrical form which carries a pair of rollers 148. The rollers 148 may be standard anti-friction bearings mounted on headed pins threaded or otherwise held in the block. They are spaced apart just far enough to straddle a cam ridge 150 formed on cam segment blocks which are held in the stationary part 40 of the support for the machine. Thus, while the rollers 148 straddle the cam 150, of the drum cam, they will translate any change in the location of that ridge into longitudinal motion of the spindle. Movement of the spindles 98 by the drum cam is effective to carry the heads 124 toward and away from each other and thereby to drive a tool through the blank.

Figure 3:
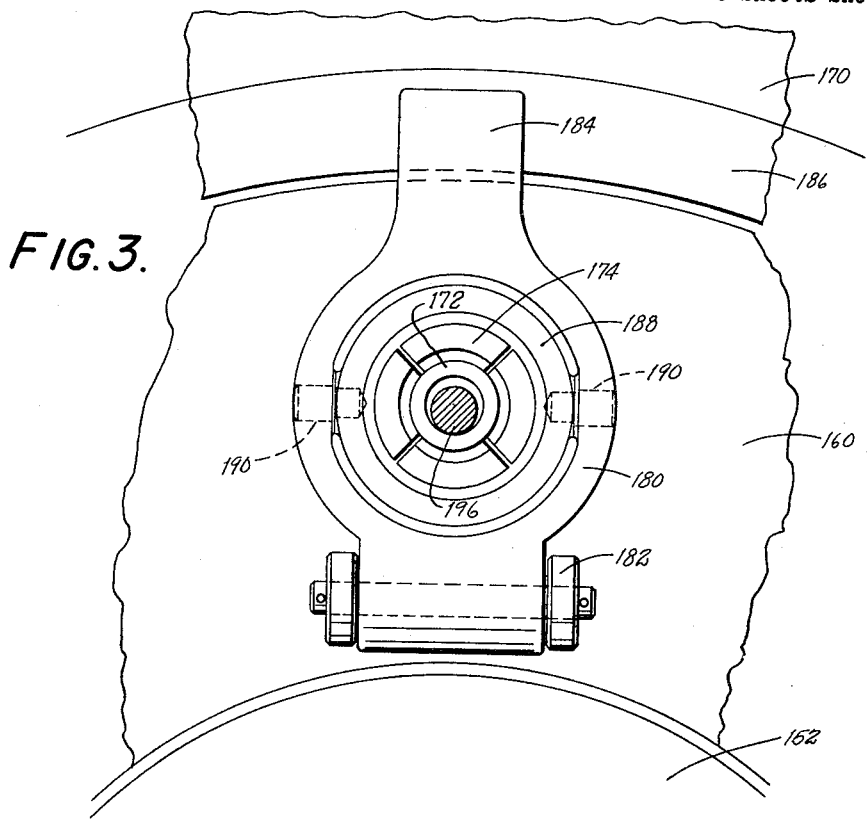
FIG. 3 is an elevational view from line 3—3 of FIG. 2.

While the work holder 84 of FIG. 1 represents the work holder shown in FIG. 3 in my aforesaid patent, I contemplate herein the work holder shown in FIGS. 44 and 46 of my original application which resulted in my aforesaid patent, particularly adapted to operate with collets which are to be tapered or threaded by a single tool at a single operation.

Figure 4:
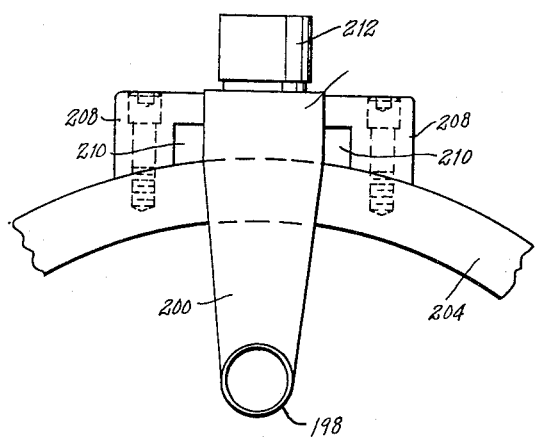
FIG. 4 is an end elevational view of the ejector arm and tube of FIGS. 2 and 3 separated from the spindle.

A novel device useful in my machine for forming an internal taper and which may be used for pipe couplings having tapered threads is shown in FIGS. 2–4. This device includes means for injecting and ejecting the workpiece. For the sake of clarity in the figures, the workpiece injector has been separately illustrated and will be described at a later point herein.

This modified work holder comprises a single main disk 152 fastened to the hub 80. This disk is formed with a plurality of particular openings 154 extending through the edge of the disk. Adjacent these openings and fixed to the disk 152 is a second disk member 156 formed as a very low cone and having a series of holes 158 formed therein and adjacent the openings 154. These holes are smaller than the openings 154, and the disk member 156 is larger in outer diameter than the disk 152 so that a complete circular hole is formed with its axis at a slope to the main central axis of the machine. A somewhat similar plate or disk 160 is fixed to the side of the disk 152 opposite the disk member 156. As shown in FIG. 2, this plate is a frusto conical plate fastened to a conical surface formed on the main disk 152. This plate 160 is formed with holes 162 of the same size and coaxial with those of the disk 156.

A rotating collet member 164 is journalled in the holes in the two plates 156 and 160 and is adapted to receive the workpiece. On its periphery and at a greater diameter than the journals in the plates, the collet member is provided with a set of gear teeth 166. The teeth 166 mesh with an internal ring gear 168 surrounding the work holder and fixed to a stationary support 170, which may be mounted in the machine. It is obvious, therefore, that as the workholder revolves, each collet member will be turned within the work holder by the meshing engagement of the gears.

The collet member contains a four-jawed spring-loaded collet for reception of the workpiece 172. This collet is formed of four jaw members 174 having tapered outer surfaces slidably disposed in a tapered bore in the member 164. Springs 176, disposed in holes in the member 164, engage ears 178 on the jaws to force them to the left in FIG. 2 which is in the direction which causes the jaws to close on the workpiece.

Means to open the collet is hinged on the plate 160 and comprises a lever member 180 hinged between ears 182 (FIG. 3) on the plate 160. An arm 184 on the lever member 180 extends outwardly beyond the periphery of the plate 160 and lies adjacent the support 170. A cam surface 186 formed on the support 170 is adapted to cause the lever 180 to move as the arm 184 rides on the surface. A ring 188 is pivoted to the lever member by a pair of trunnions 190 (FIG. 3) on a line perpendicular to the medial centerline of the lever. Thus it is possible for the ring 188 to maintain a parallelism to the face of the plate 160 while the lever 182 is pivotally moved with respect thereto. The ring 188 is disposed in an annular groove 192 in the collet jaws (FIG. 2) 174 and is, therefore, adapted to move the jaws against the pressure of the springs 176 and in response to movement of the lever 182 by the cam 186. Movement in the outward direction (to the right in FIG. 2) is effective to open the collet to allow the workpiece to be injected. A plate 194 fixed to the support 170 serves to protect the working mechanism from dirt or the like as well as being a part of the injecting mechanism described hereinafter.

The tool 196 is held by a right hand head 124 similar to those in my aforesaid patent, and carried by the spindles 89. As shown, the tool is adapted to ream a double taper in a bushing, but it will be apparent that thread-cutting teeth could be formed on the tool to cut tapered threads also. This is possible because on one end of the workpiece the tool cuts on only the bottom part of the piece, as shown in FIG. 2, whereas on the opposite end it cuts on only the top. Since the workpiece is rotated, however, a complete circle will be cut at each end, although it will be on a taper extending outwardly both ways from the center of the workpiece. It will be obvious to those skilled in the art that this machine can be used for various tapers and by proper selection of tools and depth of cut could cut a single taper or a non-symmetrical taper as well as the type shown.

The means for ejecting the workpiece 172 from the collet after the operations are completed includes a sleeve 198 carried on a depending arm 200 supported by a slide member 202. A slide ring 204 is fixed to or formed on a modified cover member 88a and rotates with the spindle-carrying drum. Guide members 208 (FIG. 4) adapted to overhang wing parts 210 of the slide member 202 are attached to this ring and therefore hold the ejector member in a fixed position relative to the ring except for a longitudinal sliding motion. This motion is governed by the engagement of a roller type follower 212 (FIG. 2) with a cam slot 214 formed in a cam ring 216. The cam ring 216 is fixed to a stationary guide member 218.

The operation of the device will be apparent to those skilled in the art. During the injection and cutting of the workpiece, the ejector is held in a retracted position as shown in FIG. 2. After completion of the cutting, the tool 196 is retracted by the left hand spindle 89, as fully explained in my aforesaid patent, to a position such that the right hand end does not extend beyond the right of the work holder. At this point, the cam slot 214 is formed to advance the sleeve 198 to the right to engage the workpiece 172. The collet is opened at the same time, and the workpiece is forced out of the collet and may fall into a chute (not shown) provided for it. The tool may then be transferred back to the right hand head and the ejector sleeve retracted again preparatory to the injection of a new workpiece.

Figure 6:
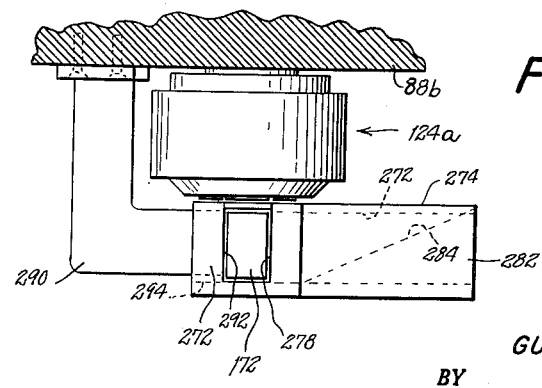
FIG. 6 is a top plan view of the injector of FIG. 5.
Figure 5:
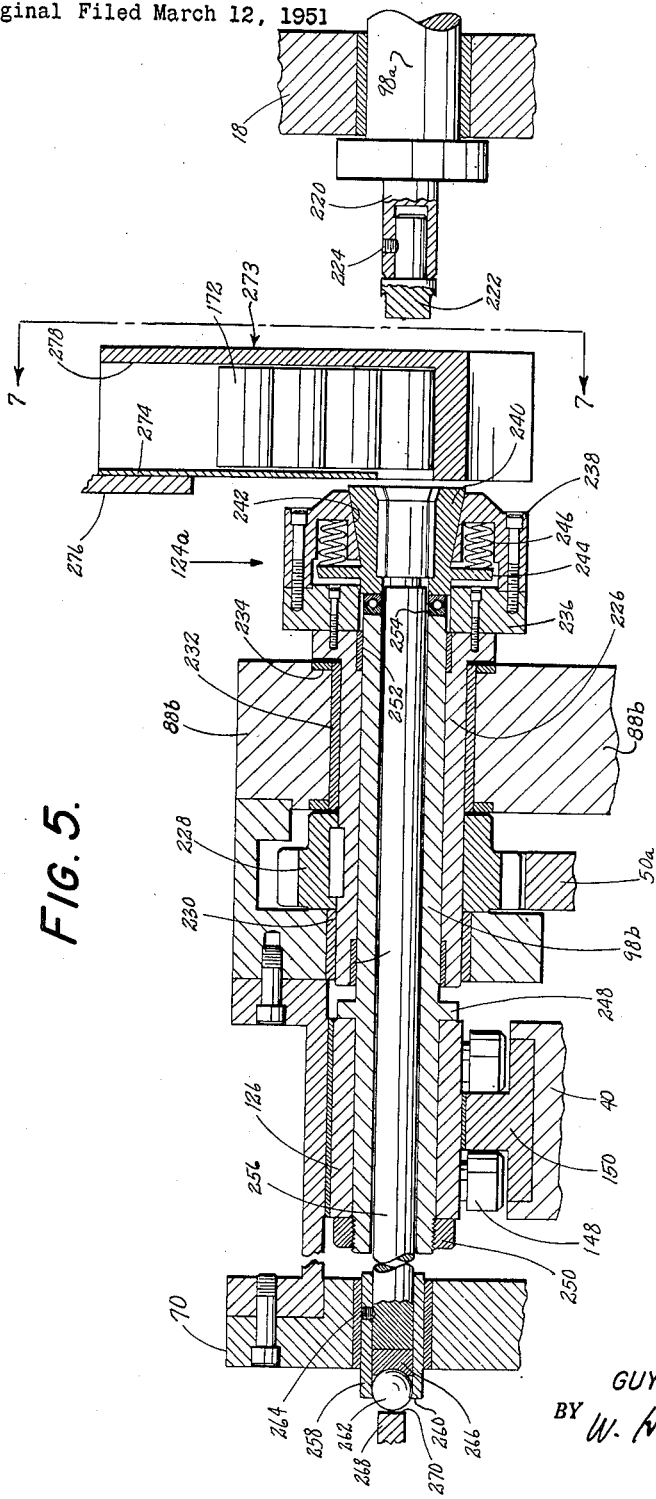
FIG. 5 is a longitudinal sectional view through a still further modified spindle and a workpiece injector associated therewith.
Figure 7:
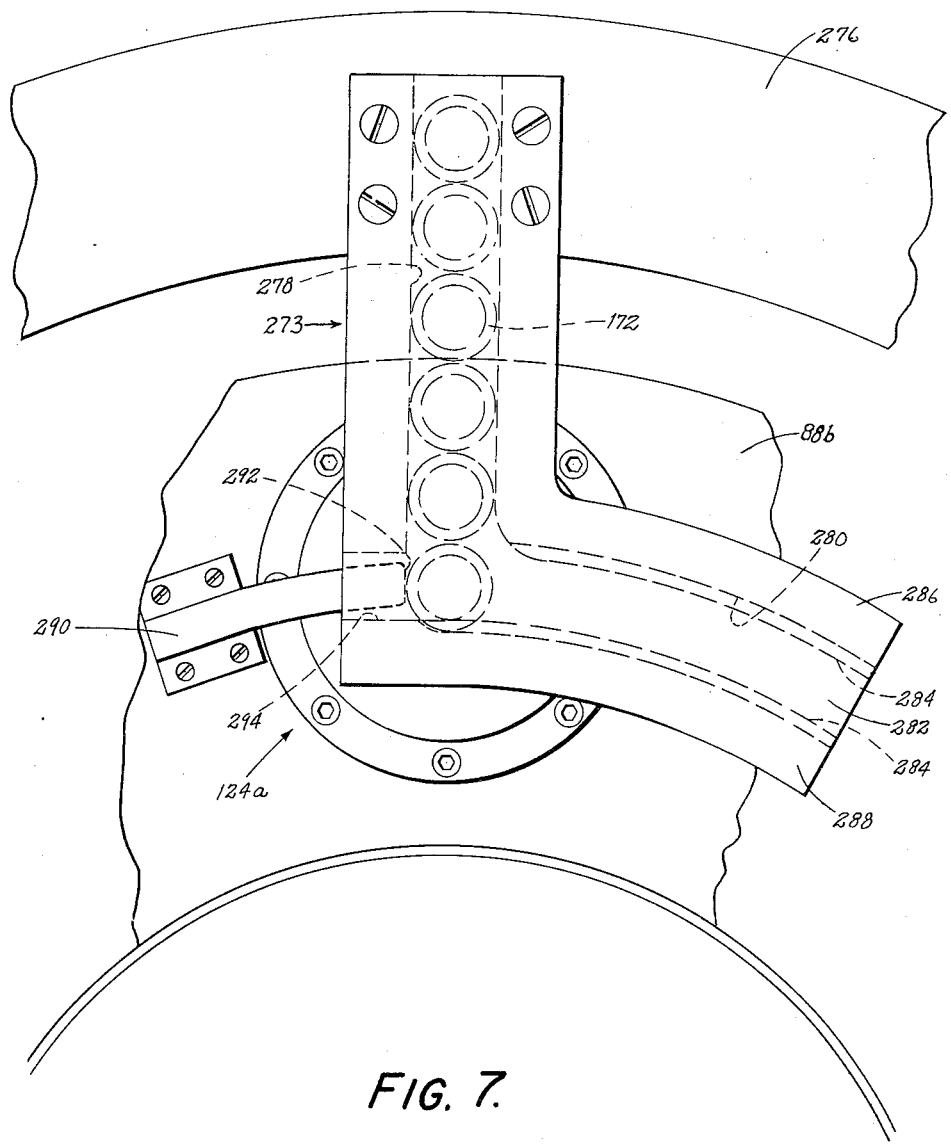
FIG. 7 is an end elevational view of the injector viewed from line 7—7 of FIG. 5.

An embodiment of my machine capable of counterboring a hole in a fitting and at the same time rounding the edges and perhaps trimming the outer diameter somewhat, along with a novel type of feeding device useful in both this embodiment and that last described is disclosed in FIGS. 5–7.

In this embodiment, as shown in FIG. 5, the spindles are not symmetrical on the two sides. The left hand spindle does not move longitudinally while the right hand spindle moves longitudinally but does not rotate. The left hand head 124a is formed with a collet which receives the workpiece and holds it securely. The head including the collet is rotated, while the axially aligned tool holding head moves toward the workpiece to the desired point and then recedes, whereupon the collet opens and the product is discharged.

More specifically, the right hand spindle 98a is held from rotating by any well known means, such as a key or spline, but is slidably journalled in the main drum of the machine. Longitudinal movement of the spindle 98a may conveniently be controlled by a drum cam similar to those previously described. At its working end, the spindle 98a carries a head 220 in which a tool bit 222 is fixed by a set screw 224 or other convenient means.

The left hand spindle 98b and head are also formed differently, although the basic structure of the drum is changed only in minor detail. The rotating part of the spindle is in the form of a sleeve 226 to which is keyed a pinion 228. The pinion 228 meshes with a sun gear 50a similar to the bull gears 50 of FIG. 1, except that here the gear need not be so wide, for there is no longitudinal movement of the pinions with which it is in mesh. The sleeve 226 may be journalled in simple bearings 230 and 232 in the end wall 18 and spindle support member 70. Thrust faces 234 may be provided in one of the bearings to resist the thrust loading on the head 124. It will be apparent that the simple bearings could in all cases be replaced by appropriate ball or roller anti-friction bearings.

The head 124 is comprised of two principal pieces, a plate member 236 bolted to the sleeve 226 and a cover member 238 which in turn is bolted to the plate 236. A collet which may be formed of four jaws 240 is disposed in the cover member. The jaws 240 have sloping outer surfaces to match a conical sloped opening 242 in the cover. Thus the collet is formed to open as the jaws are moved outwardly. An ear 244 is provided on each jaw 240, and is engaged by a spring 246 which tends to force the jaw inwardly and thus to close the collet to its normal, closed position.

The collet is opened to admit a workpiece or to discharge one by action of the drum cam ridges 150 on a follower block 126 fixed to the tubular spindle 98b. Since the spindle 98b need not rotate, the follower block 126 may be clamped to the shaft between a collar 248 and a nut 250 to preserve its fixed position. Bearing inserts 252 are provided between the spindle 226 and the shaft 98b so that the spindle may rotate freely. Since the shaft 98b does not rotate and must push open the rotating collet, a thrust bearing 254 is provided between the end of the shaft and the jaws 240 of the collet. It is apparent that movement of the shaft because of the cam action will be effective to move the jaws against the force of the springs 246 and cause them to open.

Slidably disposed within the tubular shaft 98b is a rod 256 adapted to eject the product from the collet. This rod may be controlled by a cam and follower arrangement previously described. An alternative type of follower is, however, illustrated in FIG. 5. A sleeve 258, having a flange 260 at one end formed to retain a ball 262, fits over the end of the rod 256 and is held in place by a set-screw 264. A bearing member 266 formed to fit the ball 262 is retained between the ball and the end of the rod 256, thus acting as a thrust bearing therebetween. A cam track 268 having its surface 270 shaped to provide the desired movement is fastened to the wall of the standard 14. It will be recognized that, since the cam 268 need be operative to slide the rod within the shaft only to eject a piece, it need extend for only a short distance where that action is required. For the rest of the travel of the spindle, the rod 256 may simply be carried by the shaft 98b and by the end plate 70 in which it may conveniently be journalled. After the product is ejected, the rod will be moved back to its original position by the new workpiece as it is inserted into the collet.

The means for injecting the workpiece into the collet of the work holders of FIGS. 2 and 5 is shown in FIGS. 6 and 7; the workpieces 172 are contained within a vertical channel member 273, one wall 274 of which may be formed by a plate similar to the plate 194 of FIG. 2 to form a double interior taper. The channel member conviently may be attached to a fixed support 276. A channel 278 in the member 272 extends vertically to a point where the lowest workpiece is directly in line with the opening in the collet as it passes. At this point, the channel 278 communicates with an arcuate channel 280 formed in a chute member 282. The channel 280 is open at the face adjacent the collet so that a workpiece 172 may pass longitudinally from the channel 280 into the collet.

The collets in both embodiments are carried in a circular path by the drum member and therefore pass along beside the open face of the channel 280. As they do so, means are provided to slide the workpiece 172 down the channel in line with the head and to slide it longitudinally out of the channel and into the collet. This longitudinal motion is induced by the camming action of a pair of slanting ledge-like surfaces 284 formed in the upper and lower walls 286 and 288, the edges of which engage the ends of the workpieces. These surfaces extend diagonally across the channel 280 and are of a thickness approximately equal to the wall thickness of the workpiece and slope diagonally from the wall furthest from the collet to the opening in the wall 274. While I have shown the slope as a straight line (FIG. 6), it might be desirable to use an accelerating slope, the exact shape of the surface forming no part of my invention.

In order to move the workpiece along the ledge-like surfaces 284 to be cammed into the collet thereby, a pickup arm 290 is fixed to the rotary end wall of one of the drum sections. In FIGS. 6 and 7, the pickup arm 290 is shown attached to the cover plate 88b through which the spindle 98b projects. The arm extends outwardly from the wall and over the head 124a. It will be remembered that in this embodiment, the head 124a does not move outwardly and, therefore, the arm may be in a fixed position. The end surface 292 of this arm is adapted to engage the workpiece, and is parallel to and at a fixed distance from the axis of the collet. A slot 294 is provided in the wall of the member 273 opposite the channel 280 so that the arm may pass through the slot, pick up a workpiece and by sliding it along the cam surface 284, inject it into the collet.

It will be obvious to those skilled in the art that no modification of this device is necessary to utilize it with the embodiment of FIG. 2. In that embodiment, the channel member 173 would be attached to the right face of the fixed support 170 and the arm 290 would be fastened to the plate 160 adjacent the lever member 180, and presumably, the channel 280 could be tilted at a slight angle so that the workpiece could be injected into the tilted collet. Thus, this workpiece injector is usable with either of the collet type work holding devices.

While the fundamentally novel features of the invention have been illustrated and described in connection with specific embodiments of the invention, it is believed that these embodiments will enable others skilled in the art to apply the principles of the invention in forms departing from the exemplary embodiments herein, and such departures are contemplated by the claims.

What is claimed is:

1. In a forming machine having a base, a plurality of rotatable spindles disposed in coaxial opposing pairs and adapted to pass a tool between members of said pairs, and a spindle carrier mounted on said base adapted to carry said spindles between a plurality of stations; work holder means adapted to hold a workpiece for the formation thereon of a tapered surface by said tool, comprising a driven member engaging said spindle carrier and adapted to be carried therewith, rotatable holding means adapted to hold said workpiece, said holding means being journalled in said driven member on an axis at an angle to the axis of said spindles, means mounted on said base in driving engagement with said holding means to rotate the holding means as said tool engages said workpiece, and means for rotating said spindles.

2. In a forming machine having a base, drum means rotatably mounted on said base, a plurality of rotatable spindles drivably mounted in said drum means in coaxial opposed pairs, said spindles being adapted to drive a forming tool, and drive means adapted to drive said drum means and said spindles; work holder means adapted to hold a workpiece for the formation thereon of a tapered surface by said tool comprising disk means mounted on said drum and driven therewith, a plurality of rotatable members journalled in said disk on an axis at an angle to the axis of said spindles, collet means disposed in each of said rotatable members adapted to hold said workpiece, each of said rotatable members being formed with gear teeth on the periphery thereof, and gear means mounted on said base and in meshing engagement with said teeth to cause said rotatable members to rotate as said disk member is carried around by said drum means.

3. In a forming machine having a base, drum means rotatably mounted on said base, a plurality of spindles drivably mounted in said drum means in coaxial opposed pairs, said spindles being adapted to drive a forming tool, and drive means adapted to drive said drum means and said spindles; work holder means adapted to hold a workpiece for the formation thereon of a tapered surface by said tool comprising disk means mounted on said drum and driven therewith, a plurality of rotatable members journalled in said disk on an axis at an angle to the axis of said spindles, collet means disposed in each of said rotatable members adapted to hold said workpiece, each of said rotatable members being formed with gear teeth on the periphery thereof, and gear means mounted on said base and in meshing engagement with said teeth to cause said rotatable members to rotate as said disk member is carried around by said drum means, and release means mounted on said disk means engaging said collet means adapted to open each of said collet means as it passes a predetermined location.

4. In a forming machine having a base, drum means rotatably mounted on said base, a plurality of spindles drivably mounted in said drum means in coaxial opposed pairs, said spindles being adapted to drive a forming tool, and drive means adapted to drive said drum means and said spindles; work holder means adapted to hold a workpiece for the formation thereon of a tapered surface by said tool comprising disk means mounted on said drum and driven therewith, a plurality of rotatable members journalled in said disk on an axis at an angle to the axis of said spindles, collet means disposed in each of said rotatable members adapted to hold said workpiece, each of said rotatable members being formed with gear teeth on the periphery thereof, and gear means mounted on said base and in meshing engagement with said teeth to cause said rotatable members to rotate as said disk member is carried around by said drum means, a plurality of lever means hinged to said disk means, ring means operably engaging each of said collet means and pivoted to said lever means on an axis parallel to the hinge line of said lever means, and means on said base engaging said lever means adapted to operate said lever means to open said collet means as said lever means is carried past a predetermined location.

5. In a forming machine having a base, drum means rotatably mounted on said base, a plurality of spindles drivably mounted in said drum means in coaxial opposed pairs, said spindles being adapted to drive a forming tool, and drive means adapted to drive said drum means and said spindles; work holder means adapted to hold a workpiece for the formation thereon of a tapered surface by said tool comprising disk means mounted on said drum and driven therewith, a plurality of rotatable members journalled in said disk on an axis at an angle to the axis of said spindles, collet means disposed in each of said rotatable members to hold said workpiece, each of said rotatable members being formed with gear teeth on the periphery thereof, and gear means mounted on said base and in meshing engagement with said teeth to cause said rotatable members to rotate as said disk member is carried around by said drum means, a plurality of lever means hinged to said disk means, ring means operably engaging each of said collet means and pivoted to said lever means on an axis parallel to the hinge line of said lever means, and means on said base engaging said lever means adapted to operate said lever means to open said collet means as said lever means is carried past a predetermined location, and ejector means mounted on said drum means, said ejector means being operably connected to operating means on said base, thereby being adapted to eject said workpiece from said collet as said collet is opened.

6. In a forming machine having a framework, driven spindle-carrying means journalled in said framework, spindles mounted in said carrying means adapted to hold a tool for forming a workpiece, work holder means fixed to said carrying means and including at least one work holder adapted to grip said workpiece while being formed by said tool; ejecting means for removing said workpiece from said work holder comprising a ring mounted on said carrying means, and ejector member slidably mounted on said ring, a cam formed on said framework adjacent said ring, follower means on said ejector member engaging said cam to control the position of said ejector member, tube means carried by said ejector member adapted to surround said tool, said tube means being so located as to engage said workpiece to push it out of said work holder as said ejector member is moved by said cam and follower means.

References Cited in the file of this patent

UNITED STATES PATENTS

| | | |
|---|---|---|
| 312,700 | Blakey | Feb. 24, 1885 |
| 2,429,517 | Knapp | Oct. 21, 1947 |
| 2,606,359 | Stadthaus | Aug. 12, 1952 |
| 2,828,492 | Conner | Apr. 11, 1958 |

FOREIGN PATENTS

| | | |
|---|---|---|
| 237,070 | Great Britain | July 23, 1925 |